US009309849B2

(12) United States Patent
Tanabe et al.

(10) Patent No.: US 9,309,849 B2
(45) Date of Patent: Apr. 12, 2016

(54) METHOD AND APPARATUS FOR REDUCING THE NUMBER OF SEPARATELY DISTINGUISHABLE NOISE PEAKS IN A DIRECT INJECTION ENGINE

(75) Inventors: Yosuke Tanabe, West Bloomfield, MI (US); Donald J. McCune, Farmington Hills, MI (US)

(73) Assignee: Hitachi, Ltd, Tokyo (JP)

(*) Notice: Subject to any disclaimer, the term of this patent is extended or adjusted under 35 U.S.C. 154(b) by 1376 days.

(21) Appl. No.: 13/069,944

(22) Filed: Mar. 23, 2011

(65) Prior Publication Data

US 2012/0245826 A1 Sep. 27, 2012

(51) Int. Cl.

*B60T 7/12* (2006.01)
*F02M 59/20* (2006.01)
*F02D 41/00* (2006.01)
*F02M 59/36* (2006.01)
*F02D 41/38* (2006.01)

(52) U.S. Cl.

CPC ........... *F02M 59/20* (2013.01); *F02D 41/0097* (2013.01); *F02M 59/366* (2013.01); *F02D 41/3845* (2013.01); *F02D 2200/101* (2013.01)

(58) Field of Classification Search

CPC .... F02D 1/406; F02M 59/366; F02M 59/367; F02M 59/368; F02M 2200/09; F02M 59/20; F02M 59/464; F02M 59/462; G10K 11/175; G10K 2210/1282

USPC ........... 123/500, 501, 90.15, 90.17, 435, 446, 123/299, 456, 90.16, 305, 447, 495, 399, 123/445, 568.11, 294, 508, 510; 701/105; 381/73.1

See application file for complete search history.

(56) References Cited

U.S. PATENT DOCUMENTS

| | | | | | |
|---|---|---|---|---|---|
| 3,709,639 | A | * | 1/1973 | Suda | F02M 59/366 123/499 |
| 4,476,837 | A | * | 10/1984 | Salzgeber | F02D 41/401 123/501 |
| 4,554,634 | A | * | 11/1985 | Shinoda | 701/113 |
| 4,777,921 | A | * | 10/1988 | Miyaki et al. | 123/456 |
| 5,201,297 | A | * | 4/1993 | Eblen et al. | 123/502 |
| 5,592,968 | A | * | 1/1997 | Nakashima | F02M 55/025 123/456 |
| 5,697,343 | A | * | 12/1997 | Isozumi | F02D 41/3827 123/446 |
| 5,771,864 | A | * | 6/1998 | Morishita et al. | 123/456 |
| 6,142,125 | A | * | 11/2000 | Shimayama | F02M 39/02 123/450 |
| 6,314,945 | B1 | * | 11/2001 | Sugiyama et al. | 123/506 |
| 6,378,499 | B1 | * | 4/2002 | Shimayama | F02M 39/02 123/450 |
| 6,694,952 | B1 | * | 2/2004 | Yamazaki | F02M 59/102 123/496 |
| 6,725,837 | B2 | * | 4/2004 | Hiraku | F02D 41/3809 123/436 |

(Continued)

FOREIGN PATENT DOCUMENTS

| | | | | |
|---|---|---|---|---|
| JP | 06088557 | A | * | 3/1994 |
| JP | 2002048023 | A | * | 2/2002 |

(Continued)

*Primary Examiner* — Stephen K Cronin
*Assistant Examiner* — Brian Kirby
(74) *Attorney, Agent, or Firm* — Dinsmore & Shohl LLP

(57) ABSTRACT

A method to reduce engine noise in a multi-cylinder direct injection internal combustion engine. The internal combustion engine includes a high pressure fuel pump having both an inlet valve fluidly connected to a fuel source and an outlet valve typically connected to a pressurized fuel rail. In order to reduce engine noise, especially at low engine speeds, the timing of the opening of either the fuel pump inlet valve or fuel pump outlet valve is varied so that it coincides with the opening of the fuel injectors.

5 Claims, 3 Drawing Sheets

(56) References Cited

U.S. PATENT DOCUMENTS

| | | | | |
|---|---|---|---|---|
| 6,848,477 | B2 * | 2/2005 | Treusch | F02M 37/0017 123/456 |
| 6,901,913 | B1 * | 6/2005 | Tsuchiya | F02M 55/04 123/456 |
| 7,063,073 | B2 * | 6/2006 | Ausiello | F02M 59/265 123/446 |
| 7,198,033 | B2 * | 4/2007 | Inaguma | F02D 41/3845 123/198 D |
| 7,198,034 | B2 * | 4/2007 | Ausiello | F02M 59/265 123/506 |
| 7,373,924 | B1 * | 5/2008 | Krengel | F02D 41/3005 123/457 |
| 7,392,793 | B2 * | 7/2008 | Hayakawa | F02D 41/3845 123/447 |
| 7,406,946 | B1 | 8/2008 | Watanabe et al. | |
| 7,552,720 | B2 * | 6/2009 | Borg | F02M 59/366 123/506 |
| 7,559,313 | B2 * | 7/2009 | Tokuo | F02D 41/3845 123/497 |
| 7,581,519 | B2 * | 9/2009 | Hayase | F01L 1/022 123/90.15 |
| 7,789,070 | B2 * | 9/2010 | Mouch | F02M 55/025 123/447 |
| 7,846,597 | B2 * | 12/2010 | Yamagishi | B60L 11/1881 429/428 |
| 8,015,964 | B2 * | 9/2011 | Eddy | 123/504 |
| 8,082,904 | B2 * | 12/2011 | Ordanic | F02M 59/20 123/495 |
| 8,091,530 | B2 * | 1/2012 | Surnilla | F02D 41/2464 123/446 |
| 8,245,693 | B2 * | 8/2012 | Surnilla | F02D 41/2464 123/446 |
| 8,596,051 | B2 * | 12/2013 | Malaney | F15B 21/008 60/327 |
| 2002/0130287 | A1 * | 9/2002 | Smith | F02M 25/0772 251/129.15 |
| 2004/0168677 | A1 | 9/2004 | Mashiki | |
| 2005/0211224 | A1 * | 9/2005 | Inaguma et al. | 123/458 |
| 2006/0118089 | A1 * | 6/2006 | Tokuo | F02D 41/3845 123/458 |
| 2008/0098991 | A1 * | 5/2008 | Eddy | F02D 41/3845 123/504 |
| 2009/0025686 | A1 * | 1/2009 | Kato | F02M 59/022 123/456 |
| 2009/0029226 | A1 * | 1/2009 | Yamagishi | B60L 11/1881 429/414 |
| 2009/0082939 | A1 * | 3/2009 | Iihoshi | F02D 13/0207 701/103 |
| 2009/0114191 | A1 * | 5/2009 | Pursifull | F02D 41/2496 123/447 |
| 2009/0139493 | A1 * | 6/2009 | Shafer | F02M 63/0225 123/500 |
| 2009/0241908 | A1 * | 10/2009 | Tokuo | F02D 41/3845 123/476 |
| 2010/0132798 | A1 * | 6/2010 | Malaney | F15B 21/008 137/1 |
| 2010/0279193 | A1 * | 11/2010 | Yamagishi | B60L 11/1881 429/444 |

FOREIGN PATENT DOCUMENTS

| | | | |
|---|---|---|---|
| JP | 2006070880 A | * | 3/2006 |
| JP | 2008019755 A | * | 1/2008 |

* cited by examiner

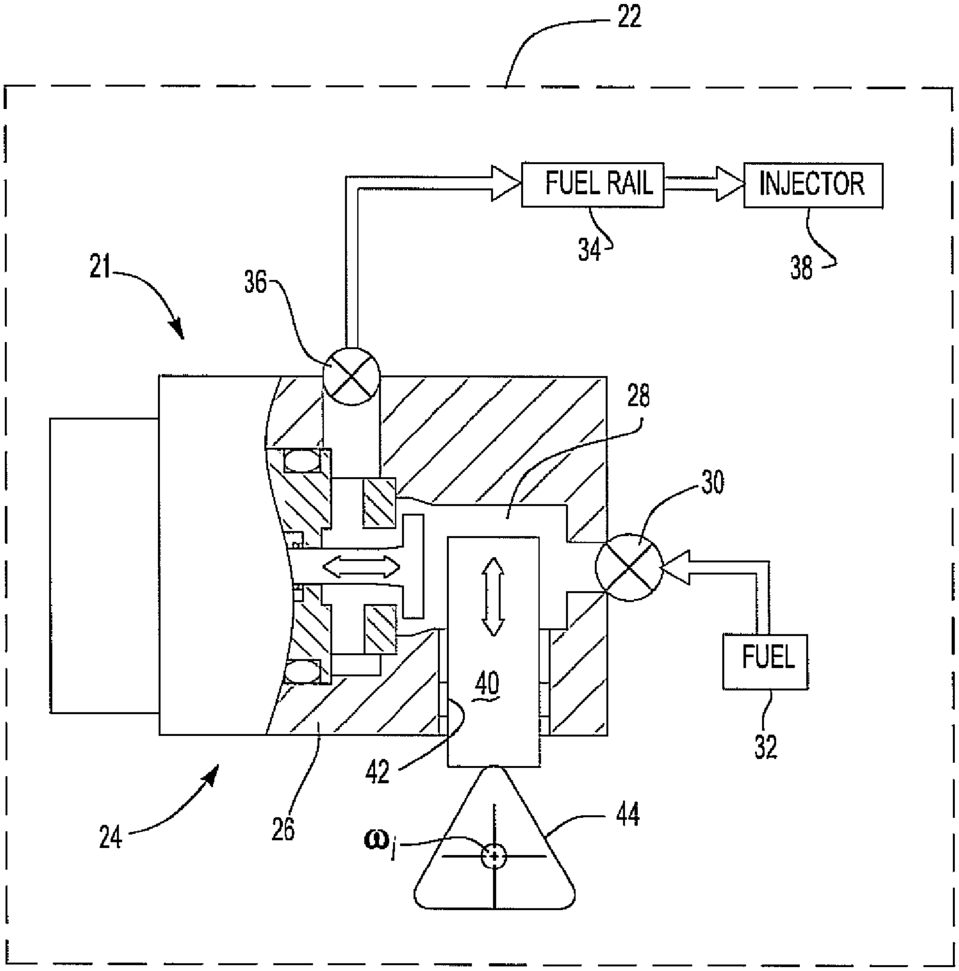
*Fig-2*
*Fig-3*
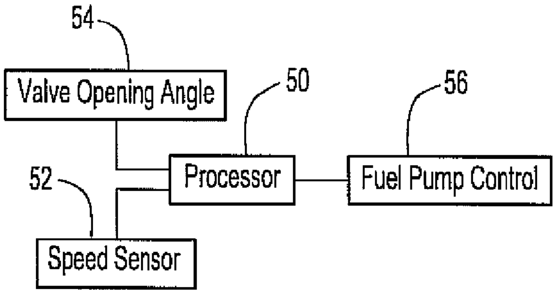

METHOD AND APPARATUS FOR REDUCING THE NUMBER OF SEPARATELY DISTINGUISHABLE NOISE PEAKS IN A DIRECT INJECTION ENGINE

BACKGROUND OF THE INVENTION

I. Field of the Invention

The present invention relates generally to direct injection internal combustion engines and, more particularly, to a method and apparatus for reducing engine noise, especially at low engine speeds.

II. Description of Related Art

Direct injection internal combustion engines of the type used in automotive vehicles have enjoyed increased popularity due in large part to their fuel economy. In a direct injection engine, the fuel injector is mounted in the engine block and has its fuel injection outlet end open directly to the internal combustion chamber. Consequently, upon activation or opening of the fuel injector, the fuel is injected directly into the internal combustion engine, rather than upstream from the fuel intake valves as in the previously known multi-point fuel injectors.

In order to supply fuel at a sufficiently high pressure to overcome the high pressures of the combustion chambers, these previously known direct injection engines include a high pressure fuel pump having an inlet connected to a fuel source such as the fuel tank, and an outlet open to a fuel rail. The fuel rail, in turn, is fluidly connected to the engine fuel injectors.

The previously known high pressure fuel pumps used with direct injection engines typically include a plunger that is reciprocally driven by a multi-lobe cam. An inlet valve is fluidly disposed in series between the fuel pump inlet and the fuel source while an outlet valve is fluidly connected in series between the fuel pump and the fuel rail. During reciprocal movement of the plunger, the plunger inducts fuel through the fuel inlet valve when the plunger moves in a first direction, and conversely the fuel pump pumps fuel out through the outlet valve to the fuel rail upon movement of the plunger in the opposite direction.

One disadvantage with the previously known direct injection engines, however, is that such engines tend to be noisy, especially at low engine speeds such as less than 1,000 rpm. The engine noise, furthermore, is largely attributable to three separate events.

More specifically, the fuel injectors themselves create noise when activated or opened due to the high pressure fuel injection. This high pressure fuel injection is oftentimes accompanied by noise causing vibration of various engine components.

The opening of the fuel inlet valve in the high pressure fuel pump also creates noise. Similarly, the opening of the outlet valve from the high pressure fuel pump also creates engine noise.

In the previously known direct injection engines, the opening of the fuel inlet valve to the fuel pump, the opening of the fuel outlet valve in the fuel pump, and the opening of the fuel injectors all occur at different crank angles of the engine crankshaft. For example, as shown in FIG. 1, graph 10 illustrates the noise created by the opening of the fuel injectors for a six cylinder direct injection engine. Graph 12 illustrates the noise output from the outlet valve of the high pressure fuel pump while graph 14 illustrates the noise generation by the inlet valve of the high pressure fuel pump.

Graphs 10-14 are illustrated as a function of the crank angle 16 of the engine crankshaft and the cam angle 18 of a multi-lobe or triangular cam used to drive the fuel pump plunger. Graph 19 illustrates the angle or position of the fuel pump plunger.

Graph 20 illustrates the total noise produced by the direct injection engine. As can be seen from graph 20, the total noise includes a separate noise peak corresponding to the fuel injector opening, the pump outlet valve opening, and the pump inlet valve opening. This noise, furthermore, is particularly noticeable to occupants of an automotive vehicle at low engine speeds, such as less than 1,000 rpm.

SUMMARY OF THE PRESENT INVENTION

The present invention provides both a method and apparatus which reduces the engine noise of a direct injection engine, especially at low engine speeds.

In brief, the present invention includes a processor which receives an engine speed signal in any conventional fashion, such as from an engine speed sensor or a calculated engine speed from the engine ECU. Whenever the engine speed is greater than a predetermined threshold, e.g. 1,000 rpm, the processor takes no action to reduce engine noise. However, whenever the engine speed is less than the predetermined threshold, the processor output signals to update the cam phase of the high pressure fuel pump cam such that the opening of the fuel inlet valve or the fuel outlet valve coincides with the timing of the fuel injectors of the engine.

For example, in the preferred embodiment, the processor first obtains the crank angles of the high pressure fuel inlet valve opening or the fuel outlet valve opening. The processor then calculates the inverse angular frequency and then the masking threshold necessary to superimpose either the fuel inlet valve opening or the fuel outlet valve opening with the fuel injection timing. The processor then generates an output signal to update the cam phase of the fuel pump multi-lobe cam to superimpose either the fuel inlet valve opening or fuel outlet valve opening with the fuel injector opening.

By superimposing either the fuel pump inlet valve or the fuel pump outlet valve timing with the activation or opening of the fuel injectors at low engine speeds, the number of noise peaks from the engine is effectively reduced.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a diagrammatic view of a high pressure fuel pump;

FIG. 3 is a block view illustrating the overall system of the present invention;

DETAILED DESCRIPTION OF PREFERRED EMBODIMENTS OF THE PRESENT INVENTION

Figure 6:
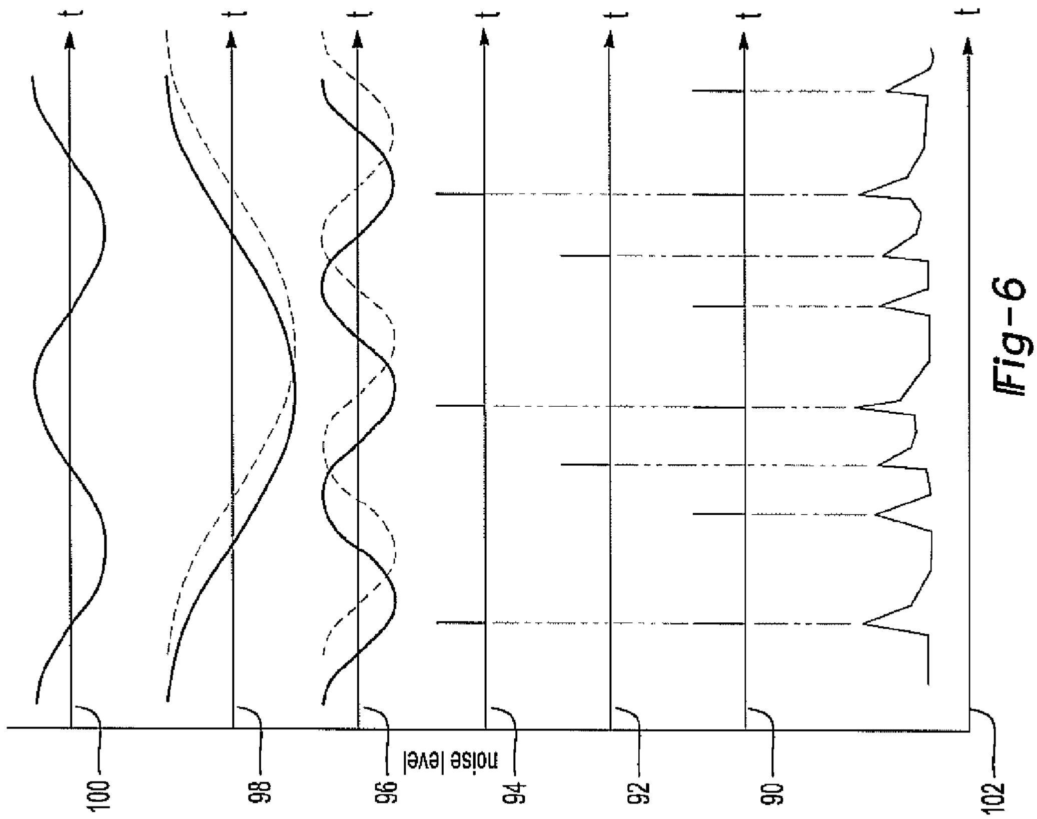
FIG. 6 is a view similar to FIG. 1, but illustrating the effect of the method of the present invention.

With reference first to FIG. 2, a portion of a fuel system 21 for a direct injection internal combustion engine 22 (illustrated only diagrammatically) is shown. The engine 22 is of the type used in automotive vehicles and thus includes multiple cylinders which rotatably drive a cam 44 (illustrated diagrammatically).

The fuel system 21 includes a fuel pump 24 having a housing 26 which defines an internal pump chamber 28. An inlet valve 30 is fluidly connected in series between the pump chamber 28 and a fuel source 32, such as a fuel tank. Similarly, a fuel rail 34 is fluidly connected in series to the pump chamber 28 through a fuel pump outlet valve 36.

In a conventional fashion, a fuel injector 38 (only one illustrated) is associated with each cylinder in the direct injection engine 22. An engine control unit (ECU) also controls the activation or opening of the fuel injectors 38 in the conventional fashion.

Still referring to FIG. 2, a pump plunger 40 is reciprocally mounted within a bore 42 in the pump housing 26 and this bore 42 is open to the pump chamber 28. The multi-lobe cam 44 is rotatably driven by the direct injection engine and abuts against the pump plunger 40. Consequently, rotation of the cam 44 in synchronism with the engine crankshaft reciprocally drives the plunger 40 in its bore 42.

In the conventional fashion, the reciprocation of the pump plunger 40 in its bore 42 inducts fuel into the fuel chamber 28 whenever the plunger 40 moves away from the pump chamber 28. During this time, fuel is inducted from the fuel tank 32, through the inlet valve 30, and into the pump chamber 28. Conversely, reciprocation of the pump plunger 40 in the opposite direction, i.e. towards the pump chamber 28, pumps fuel through the outlet valve 36 to the fuel rail 34 and ultimately to the fuel injectors 38.

With reference now to FIG. 3, a block diagrammatic view illustrating the overall noise reduction system of the present invention is illustrated. The system includes a processor 50 which receives an input signal from a speed sensor 52 of the engine crankshaft speed. The processor 50 also receives a signal from a crank angle sensor 54 indicative of the opening timing of either the pump inlet valve 30 or the pump outlet valve 36.

The processor is programmed so that, whenever the engine speed is less than a predetermined threshold $T_{rpm}$, the processor 50 generates an output to a fuel pump control 56. The fuel pump control then varies the angle of the fuel pump cam 44 so that the opening of either the fuel inlet valve 30 or the fuel outlet valve 36 coincides with the activation or opening of the fuel injectors 38.

Figure 4:
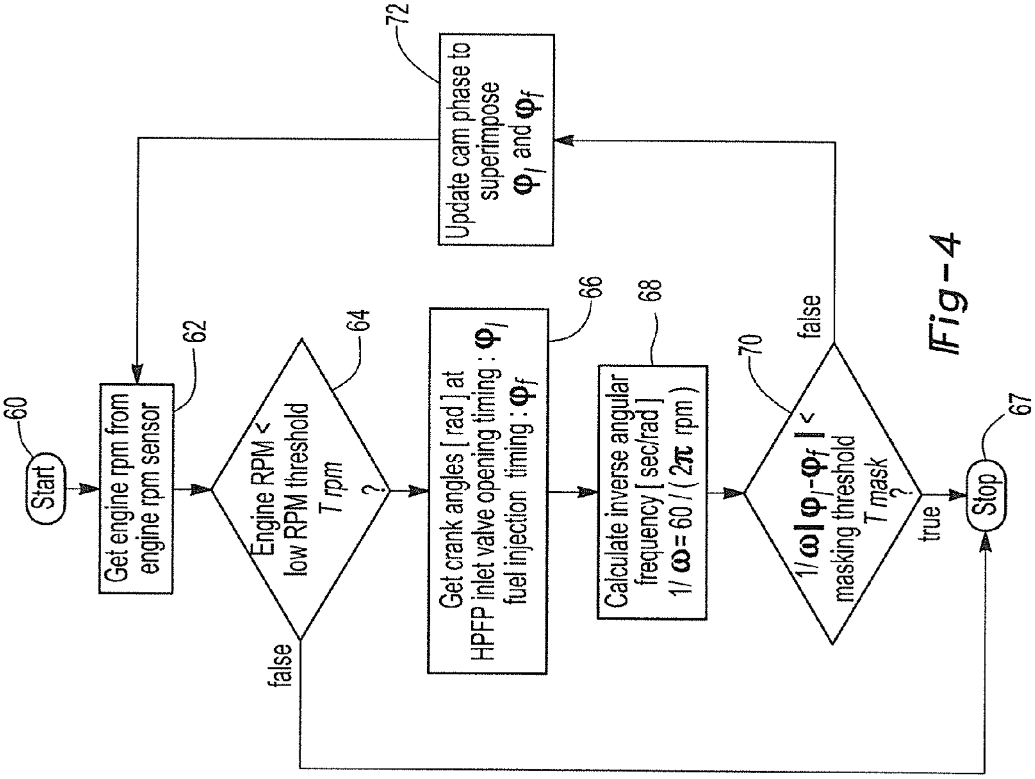
FIG. 4 is a flowchart illustrating the operation of the present invention.

With reference now to FIG. 4, a flowchart illustrating the operation of the present invention is shown. After the processor 50 starts at step 60, step 60 proceeds to step 62 where the processor gets the engine crankshaft rpm from the speed sensor 52. Step 62 then proceeds to step 64.

At step 64, the processor 50 compares the actual engine speed with the low speed threshold $T_{rpm}$. If the engine rotational speed is greater than the threshold $T_{rpm}$, step 64 proceeds to step 66 and terminates the routine.

Conversely, whenever the engine rotational speed is less than the threshold $T_{rpm}$, step 64 instead proceeds to step 66 where the processor 50 inputs the crank angle ω in radians, and also the pump inlet valve 30 opening angle or timing $\omega_i$. Step 66 also determines the fuel injection angle or timing $\omega_f$. Step 66 then proceeds to step 68.

At step 68, the processor calculates the inverse angular frequency (seconds/radians), i.e. in accordance with the following formula:

$$1/\omega=60/(2\pi\ \text{rpm})$$

Step 68 then proceeds to step 70.

At step 70, the difference between the fuel injection timing $\omega_f$ and the inlet valve opening $\omega_i$ is multiplied by the inverse angular frequency and compared to a masking threshold $T_{mask}$ as follows:

$$1/\omega|\omega_i-\omega_f|<T_{mask}$$

If less than the masking threshold, i.e. the difference between $\omega_i$ and $\omega_f$ is small and the inlet valve opening substantially coincides with the fuel injection timing, step 70 proceeds to step 67 and exits from the routine. Otherwise, step 70 proceeds to step 72 where the phase angle of the fuel pump cam 44 is updated by the processor 50 to superimpose the fuel pump inlet valve opening with the fuel injection timing by sending the appropriate signal to the fuel pump control 56 (FIG. 3). Step 72 then branches back to step 62 where the above process is repeated.

Figure 5:
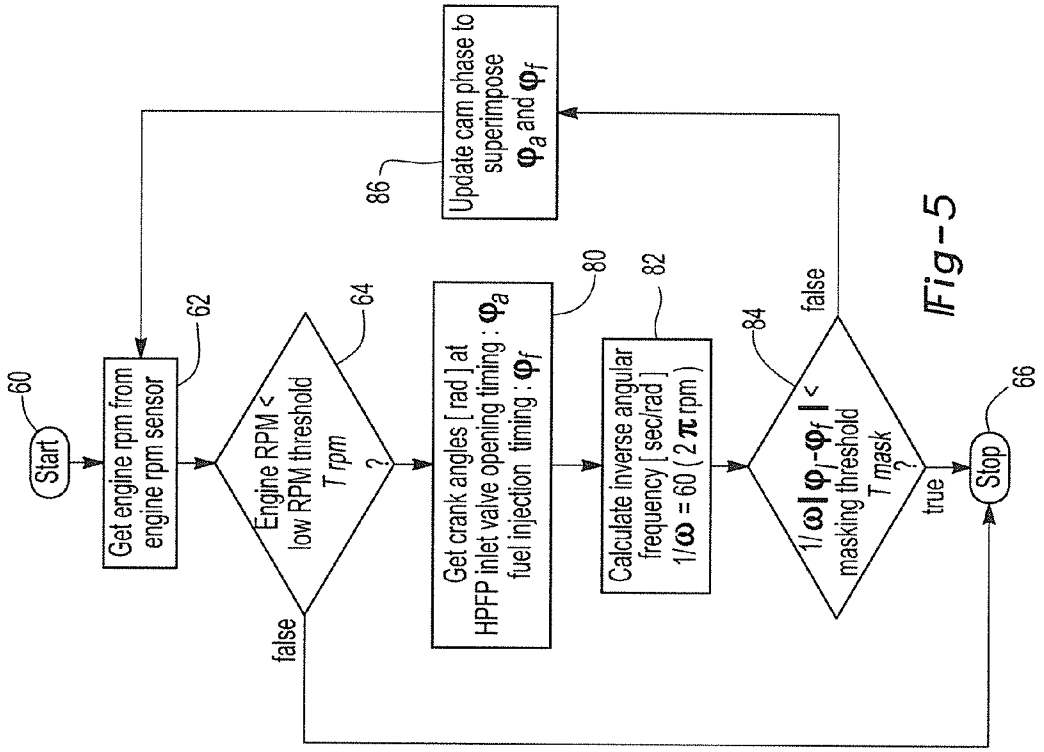
FIG. 5 is a view similar to FIG. 4, but showing a modification thereof.

With reference now to FIG. 5, a flowchart illustrating the operation of the present invention to superimpose the opening of the fuel pump outlet valve 36, rather than the inlet valve 30, with the fuel injection timing is illustrated. The flowchart of FIG. 5, furthermore, is similar in many respects to the flowchart shown in FIG. 4. For example, steps 60-64 in FIG. 5 are identical to the same steps 60-64 in FIG. 4 and, for that reason, will not be repeated.

Whenever the engine rpm is less than the threshold $T_{rpm}$, step 64 branches to step 80 in which the crank angle of the outlet valve opening $\omega_o$, rather than the inlet opening as in FIG. 4, is obtained by the processor 50 together with the fuel injection timing $\omega_f$. Step 80 then proceeds to step 82.

Step 82 is identical to prior step 68 and calculates the inverse angular frequency ω of the engine. Step 82 then proceeds to step 84. At step 84, the difference between the fuel pump outlet valve opening timing and the fuel injection timing is multiplied by the inverse angular frequency and compared to the masking threshold $T_{mask}$ in accordance with the following formula:

$$1/\omega|\phi_o-\phi_f|<T_{mask}$$

If less than the masking threshold $T_{mask}$, indicative that the fuel pump outlet valve opening and the fuel injection opening are substantially superimposed with each other, step 84 proceeds to step 66 and exits to step 66.

Otherwise, step 84 proceeds to step 86 in which the processor 50 generates an output signal to the fuel pump control 56 (FIG. 3) to update the phase of the cam 44 to superimpose the fuel pump outlet valve opening $\omega_o$ with the fuel injector opening $\omega_f$. Step 86 then proceeds back to step 62 where the above process is repeated.

Figure 1:
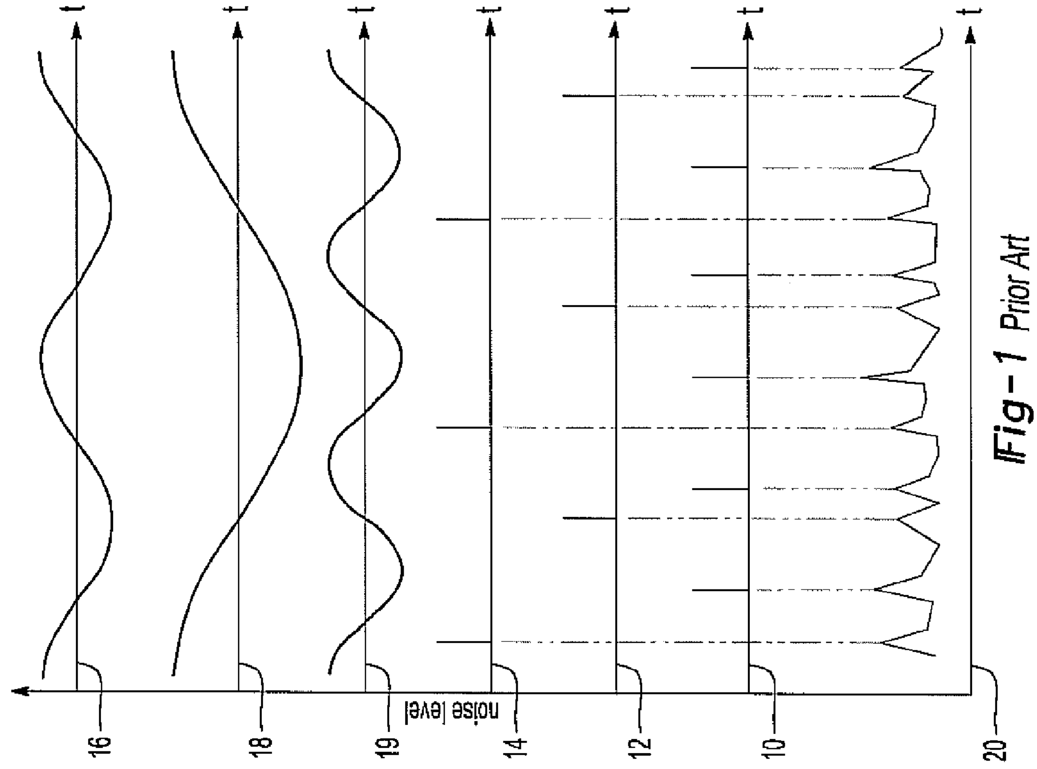
Fig-1 Prior Art
FIG. 1 is a prior art view illustrating noise generation by a direct injection engine.

With reference now to FIG. 6, the overall effect of the present invention is graphically shown. FIG. 6 corresponds to the prior art figure FIG. 1. Furthermore, FIG. 6 illustrates the effect of superimposing the fuel pump inlet valve opening with the fuel injector opening in accordance with the flowchart of FIG. 4.

More specifically, graph 90 illustrates the noise from the fuel injector timing. Graph 92 illustrates the noise from the pump outlet valve 36 while graph 94 illustrates the noise from the fuel pump inlet valve 30.

Unlike the prior art devices, however, the fuel pump plunger angle, shown at graph 96, is shifted from the position shown in phantom line and to the position shown in solid line. This shift, furthermore, corresponds to the phase shift of the multi-lobe cam phase shift illustrated in graph 98. This phase shift is also shifted, relative to the crank angle shown in graph 100, from the position shown in phantom line and to the position shown in solid line.

The net effect of the phase shift of the pump cam which results in a phase shift of the plunger angle superimposes the noise created by the inlet valve with the noise created by the fuel injectors as shown in graphs 94 and 90, respectively. This, in turn, effectively reduces the number of peaks on the overall noise, illustrated by graph 102, by three noise peaks per engine revolution for a six cylinder engine. In doing so, it reduces the overall noise sensation for occupants of a vehicle at low engine speeds.

The effect of flowchart 5 is essentially identical to that shown in FIG. 6, except that the noise peaks from the outlet valve shown at graph 92 are superimposed on the noise peaks of the injector timing shown in graph 90, rather than the noise peaks from the inlet valve shown in graph 94. As such, a further explanation is not required.

From the foregoing, it can be seen that the present invention provides an effective noise reduction method and apparatus for a direct injection engine, especially at low engine speeds. Having described our invention, however, many modifications thereto will become apparent to those skilled in the art to which it pertains without deviation from the spirit of the invention as defined by the scope of the appended claims.

We claim:

1. In a multi-cylinder direct injection internal combustion engine with at least one fuel injector per cylinder which, when open, injects fuel into its associated cylinder and a high pressure fuel pump with an inlet valve and an outlet valve fluidly connected in series with the fuel pump and a fuel rail which supplies to the fuel injectors, a method for reducing engine noise comprising the steps of:

varying the timing of the opening of one of the fuel pump inlet valve and the fuel pump outlet valve to coincide with opening of the fuel injectors, determining the engine speed, only varying said timing when the engine speed is less than a predetermined threshold.

2. The method as defined in claim 1 wherein the pump includes a multi-lobe cam which drives a pump plunger and wherein said varying step comprises the step of varying the cam angle of the cam.

3. A direct injection internal combustion engine with multiple cylinders and at least one fuel injector per cylinder which, when open, injects fuel into the cylinder, a high pressure fuel pump with an inlet valve and an outlet valve and a reciprocating piston driven by a cam, apparatus for reducing engine noise comprising:

means for varying the angle of the fuel pump cam, a processor programmed to control said varying means so that the opening of one of the inlet valve and outlet valve coincides with the opening of the fuel injectors, wherein said processor is programmed to determine engine speed and vary said timing of one of said inlet valve and said outlet valve only when the engine speed is less than a predetermined threshold.

4. In a multi-cylinder direct injection internal combustion engine with at least one fuel injector per cylinder which, when open, injects fuel into its associated cylinder and a high pressure fuel pump with an inlet valve and an outlet valve fluidly connected in series with the fuel pump and a fuel rail which supplies to the fuel injectors, a method for reducing engine noise comprising the steps of:

varying the timing of the opening of one of the fuel pump inlet valve and the fuel pump outlet valve to coincide with opening of the fuel injectors, wherein said varying step comprises the steps of:

determining a crank angle of an engine crankshaft, calculating an inverse angular frequency of the crank angle, comparing the difference between the fuel pump inlet valve timing and the fuel injector timing multiplied by the inverse angular frequency of the crank angle to a predetermined threshold, and varying the timing of the fuel pump inlet valve timing to more closely correspond to said fuel injector timing only when the difference between the fuel pump inlet valve timing and the fuel injector timing multiplied by the inverse angular frequency of the crank angle exceeds said predetermined threshold.

5. In a multi-cylinder direct injection internal combustion engine with at least one fuel injector per cylinder which, when open, injects fuel into its associated cylinder and a high pressure fuel pump with an inlet valve and an outlet valve fluidly connected in series with the fuel pump and a fuel rail which supplies to the fuel injectors, a method for reducing engine noise comprising the steps of:

varying the timing of the opening of one of the fuel pump inlet valve and the fuel pump outlet valve to coincide with opening of the fuel injectors, wherein said varying step comprises the steps of:

determining a crank angle of an engine crankshaft, calculating an inverse angular frequency of the crank angle, comparing the difference between the fuel pump outlet valve timing and the fuel injector timing multiplied by the inverse angular frequency of the crank angle to a predetermined threshold, and varying the timing of the fuel pump outlet valve timing to more closely correspond to said fuel injector timing only when the difference between the fuel pump outlet valve timing and the fuel injector timing multiplied by the inverse angular frequency of the crank angle exceeds said predetermined threshold.

* * * * *